United States Patent [19]

Myers

[11] Patent Number: 4,772,434

[45] Date of Patent: Sep. 20, 1988

[54] SOAP MAKING PROCESS

[75] Inventor: E. Gary Myers, Scottsdale, Ariz.

[73] Assignee: The Dial Corporation, Phoenix, Ariz.

[21] Appl. No.: 915,283

[22] Filed: Oct. 3, 1986

[51] Int. Cl.[4] .......................... B29B 7/10; B29B 7/84; C11D 13/10; C11D 13/18

[52] U.S. Cl. ........................................ 264/8; 252/108; 252/369; 252/370; 260/415; 260/416; 260/417; 260/418; 264/101; 264/117; 264/118; 264/211.11; 366/12; 366/13; 366/139; 366/223; 366/224; 366/298

[58] Field of Search ................. 264/75, 101, 102, 118, 264/211.11, 117, 8; 252/108, 369, 370; 260/413 S, 414, 415, 416, 417, 418; 366/12, 13, 139, 222, 223, 224, 298; 34/15

[56] References Cited

U.S. PATENT DOCUMENTS

| | | | |
|---|---|---|---|
| 1,722,687 | 7/1929 | Spensley | 252/370 |
| 2,730,539 | 1/1956 | Bradford | 260/417 |
| 2,753,363 | 7/1956 | Winer | 260/413 S |
| 3,657,146 | 4/1972 | Fransen et al. | 252/369 |
| 4,294,771 | 10/1981 | Pietralla et al. | 260/413 S |
| 4,397,760 | 8/1983 | Story et al. | 252/370 |
| 4,474,683 | 10/1984 | Story et al. | 252/369 |
| 4,636,084 | 1/1987 | Kopernicky | 264/102 X |

FOREIGN PATENT DOCUMENTS

| | | | |
|---|---|---|---|
| WO83/00502 | 2/1983 | PCT Int'l Appl. | 252/369 |

*Primary Examiner*—Jeffery Thurlow
*Assistant Examiner*—Leo B. Tentoni
*Attorney, Agent, or Firm*—Bernard L. Howard; Richard G. Harrer

[57] ABSTRACT

A process for the preparation of soap and soap/synthetic detergent products from raw materials normally employed in the manufacture of such products including fatty acids, triglycerides and caustic by subjecting such raw materials to intensive countercurrent mixing whereby saponification takes place in a relatively short time, and whereby cooling and moisture removal of the soap mass is accomplished by making the mixing vessel substantially air tight and applying a vacuum to the soap mass within the vessel to yield a product, preferably in granular form, which requires no further drying for most uses. The resulting product can, if desired, can then be subjected to plodding, extrusion and stamping to form soap in bar form. The starting material can also be a mixture of such raw materials where neutralization has already proceed to some degree, preferably to the neat soap stage.

24 Claims, 3 Drawing Sheets

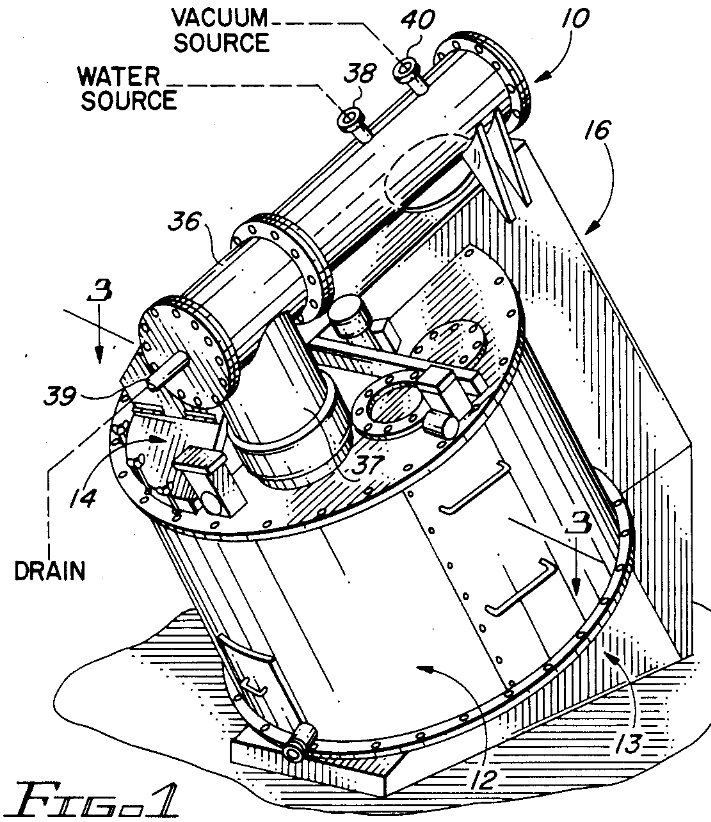
FIG. 1
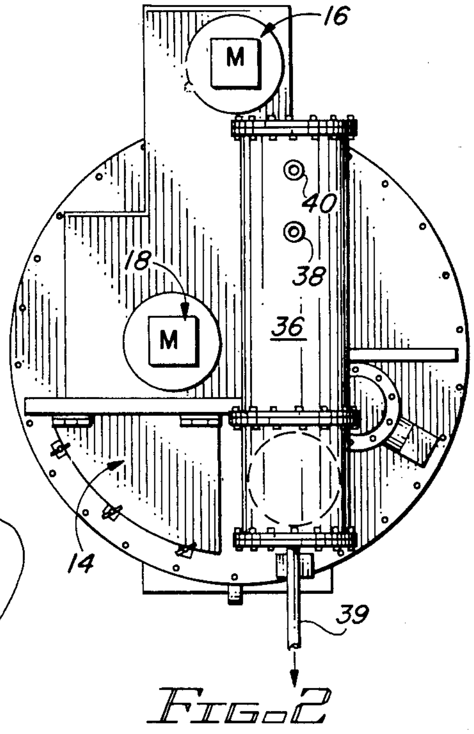
FIG. 2
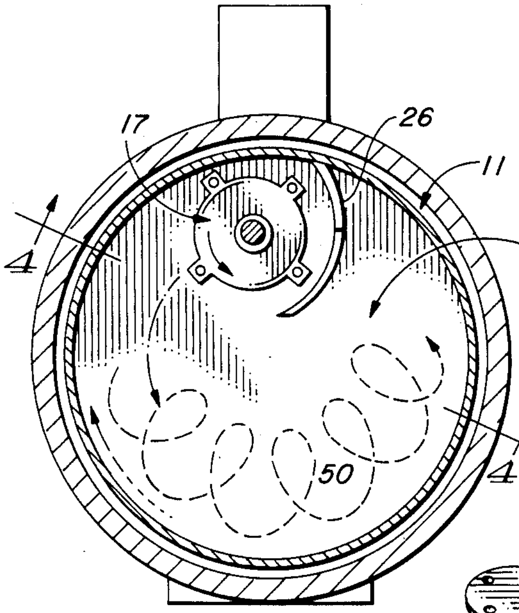
FIG. 3
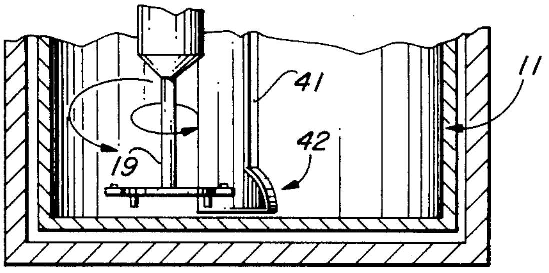
FIG. 4
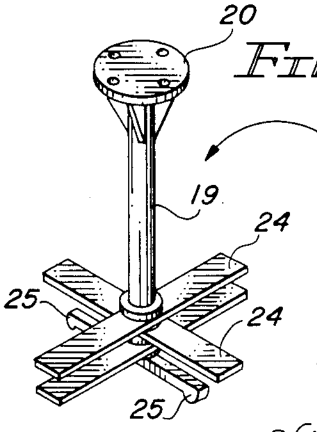
FIG. 6
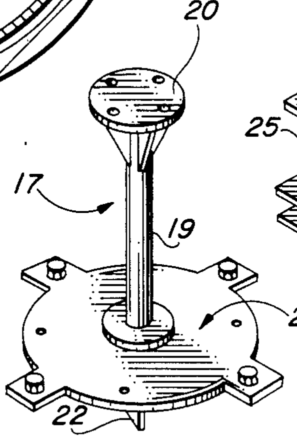
FIG. 5
FIG. 7
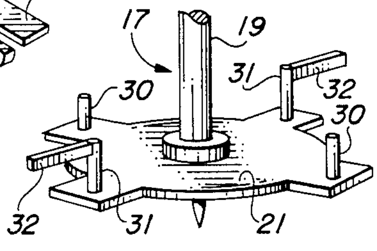

SOAP MAKING PROCESS

BACKGROUND OF THE INVENTION

This invention relates to energy saving, rapid processes for the preparation of soap and soap/synthetic detergent products by the use of countercurrent mixing. More particularly, the invention relates to the use of vacuum during the cooling and moisture removal stage of preparing soap by countercurrent mixing, usually in granular form, from the raw materials normally employed in making soap. The invention also relates to the use of vacuum during soap drying by countercurrent mixing, usually to a granular form, where neutralization of the reactants is essentially completed, that is, the so-called neat soap stage has already been reached.

Although soap can be made by a number of different techniques, today its commercial manufacture basically involves either some type of batch (kettle) saponification or a continuous process which includes the splitting of fats into fatty acids and glycerine and then the neutralization of such fatty acids with caustic (usually either sodium hydroxide or potassium hydroxide) containing the proper amount of water to yield a neat soap containing about 30 percent by weight of moisture. While the most modern way to make soap is neutralizing fatty acids, considerable soap is still made by batch techniques which involve "cold process saponification", "semi-boiled saponification", and a so-called "kettle process".

Cold process saponification is the simplest of the batch procedures and since neither lyes or nigre are separated, the glycerol and impurities from the fats remain in the soap. The charge of fat is simply melted in a vessel equipped with a mechanical stirrer and the calculated amount of caustic soda solution is added with vigorous stirring. The fats and oils are mixed for a short time, usually from about ten minutes to one hour, or before the mix becomes too viscous to pour. At this time saponification is about 90% complete. The mix is then poured into a frame and stored about two days to a week until hard. During this aging period, the saponification is completed.

The semi-boiled saponification technique is similar to the cold process, although a higher temperature is used to speed saponification and permit adjustment of the alkali content before framing. The fat charge and alkali (which may be caustic potash when soft soaps are desired) are thoroughly mixed at 160°-175° F. until the soap becomes smooth. No glycerine is recovered in this process.

The kettle process usually involves recovery of the glycerine. In this process fat and a relatively weak solution of sodium hydroxide are pumped into the kettle simultaneously. As soon as the dilute caustic mixes with the fat, saponification starts. The liquid mass is boiled by the admission of steam at the bottom of the kettle and as saponification proceeds, stronger caustic is added gradually until the saponification is almost complete. The soap is then "salted-out" or "grained-out" by the addition of a large amount of salt; the sodium soap, being insoluble in the concentrated salt solution and of a lower density rises to the top of the kettle and the solution containing salt, glycerine, impurities and excess alkali collect at the bottom of the vessel. This bottom brine layer is drawn off and then water and an excess of lye are added to the soap remaining in the kettle. The mixture is boiled with steam to saponify the last traces of fat. The solution which collects at the bottom of the kettle during the subsequent settling process is drawn off. Brine is then added to the soap; the mass is boiled and allowed to stand until brine washed soap rises to the top of the kettle. The brine washing is repeated several times with fresh brine until the excess alkali and glycerine in the soap are reduced to a minimum. The neat soap is then sent to dryers such as a Procter-Swartz drier.

No matter which of the above soap making procedures is employed, the end product is neat soap which is usually subjected to further processing. For example, when neat soap is to be further processed to form bars or flakes, the water content of the neat soap must be reduced to the range of about 10-20 percent by weight. This drying can be accomplished in a number of ways. In one procedure the neat soap flows onto a so-called chill roll which spreads the fluid soap into a thin film which then solidifies. The solidified soap film is removed in ribbon form and then oven dried to the required moisture content. More modern techniques utilize vacuum spray dryers to reduce the moisture content to a proper level. Following drying, the soap is passed to an amalgamator where perfume, color and other additives are mixed into the soap mass, and thereafter the soap can be milled and plodded. The final steps to bar soap manufacturer include the extrusion of the plodded soap through a tapered outlet to form a continuous log followed by cutting, stamping and finally packaging. It will be appreciated that in conventional soap bar/soap flake manufacturing practices, the drying and plodding steps are energy intensive and very time consuming and it would be extremely desirable to develop a soap-making process which would either substantially reduce or eliminate the drying operation which is currently required to produce most soap products.

Various proposals have been advanced to solve the problem of producing low moisture soap by eliminating of substantially reducing the energy required for drying but so far as we know none have really proved to be commercially feasible. For example, U.S. Pat. No. 2,730,539 discloses a method of saponifying fat such as talow of vegetable oils with caustic to form a low moisture content soap using a "muller" type mixer. The soap making ingredient, such as tallow, and a solution of caustic soda are introduced into the muller mixer and subjected to a shearing and smearing action by the mulling action of the heavy wheels rolling over the materials in the pan. According to the patent, a high order of mechanical pressure is applied to the soap-forming ingredients which results in a soap which is said to be suitable for plodding and then stamping into bars.

Also, U.S. Pat. No. 3,657,146 discloses a process for the direct production of soap from fatty acids and caustic in a pressure vessel at about 2 to 10 atmospheres and at a temperature ranging from 120° to 180° C. The process is said to produce a soap having not more than about 25 percent water content; although it is noted that example 2 of said patent shows a soap which contains 9 percent of free fatty acids and 145 percent water.

In addition, the use of a two-stage saponification procedure is disclosed in U.S. Pat. No. 2,753,363. The initial reaction takes place between the fatty acids and a dry, alkali metal carbonate such as sodium carbonate to achieve a partial saponification. Following this the partially saponified mass is treated with aqueous alkali metal hydroxide to complete the reaction.

U.S. Pat. No. 1,722,687 discloses the use of a high speed centrifugal pinned disc mill to make framed soaps, soft soaps and dry soap powders. In the process the soap making ingredients are introduced into the mill to make and the lower rotating disc is run at very high speed causing a beating action of the reactants by the lower rotating pins and upper stationary pins.

In additions to the foregoing, U.S. Pat. Nos. 4,397,760 and 4,474,683, of which the Applicant herein was a co-inventor, disclose the use of intensive countercurrent mixing to homogenize a fatty acid source with caustic which leads to rapid saponification, followed by a cooling and moisture removal step involving the blowing of air into the neat soap during continued countercurrent mixing to form soap granules having a moisture content of less than about 20%. According to this process, drying of the soap to the desired extent is accomplished in the same apparatus in which saponification occurs, and does not require any external heating or cooling to accomplish moisture removal. The soap granules so produced require no further drying for most purposes. This process also does not require a seperate amalgamation step, as additives such as colorants and perfume can be mixed with the soap granules in the mixing container.

Furthermore, according to U.S. Pat. No. 4,474,683 the neat soap prepared by various prior processes such as the continuous process (which includes splitting fats into fatty acids and glycerine and then neutralization of the acids with caustic), the cold process, the semi-boiled process, or the kettle process can be subjected to intensive countercurrent mixing to yield a low moisture soap in granule or even powder form.

SUMMARY OF THE INVENTION

In a particular embodiment, a process for making soap granules is disclosed, using raw materials normally employed in soap manufacture including a fatty acid source and caustic, comprising the steps of introducing the materials into an enclosed mixing vessel, causing the materials in the vessel to rotate in a generally circular path while simultaneously bringing the materials into contact with a rotating means mounted within the vessel, with the rotating means rapidly rotating in a direction counter to the initial direction of flow of the materials in the vessel whereby saponification takes place, making the vessel substantially air tight and applying a vacuum to the materials within the vessel whereby soap granules are formed having a moisture content of less than about 20% by weight.

In a further embodiment a rapid process for the production of low moisture soap is disclosed whereby the mixing vessel is made substantially air tight and a gradually increasing vacuum is applied to the materials within the mixing vessel to cool and remove moisture therefrom and form soap granules having a typical moisture content of about 20% by weight.

In a further embodiment a process for making soap granules is disclosed, using a mixture of a fatty acid source and caustic or alkali wherein neutralization of said fatty acid source has proceeded to some degree, preferably the neat soap stage, comprising the steps of introducing the mixture into an enclosed mixing vessel, causing the mixture in the vessel to rotate in a generally circular path while simultaneously bringing the mixture into contact with a rotating means mounted within the vessel, the rotating means rapidly rotating in a direction counter to the initial direction to flow of the mixture in the vessel whereby saponification, if required, takes place, making the vessel substantially air tight and applying a vacuum to the mixture within the vessel whereby soap granules are formed having a moisture content of less than about 20% by weight.

There are other embodiments and aspects of the invention which are set forth more fully in the Description of the Preferred Embodiments.

BRIEF DESCRIPTION OF THE DRAWINGS

FIG. 1 is a perspective view of mixing equipment adapted to provide the intensive countercurrent mixing of the fatty acid sources and caustic, and adapted to cool and remove moisture from the soap by applying vacuum.

FIG. 2 is a horizontal view of the mixing equipment of FIG. 1.

FIG. 3 is a horizontal sectional view of the mixing equipment of FIG. 1 taken substantially on the line 3—3 of FIG. 1.

FIG. 4 is a fragmentary sectional view of the mixing equipment of FIGS. 1-3 taken substantially on the line 4—4 of FIG. 3.

FIGS. 5-8 and FIG. 10 are perspective views of rotors which can be employed in the mixing equipment shown in FIGS. 1-4 or the mixing equipment of FIG. 11.

DESCRIPTION OF THE PREFERRED EMBODIMENTS

Figure 8:
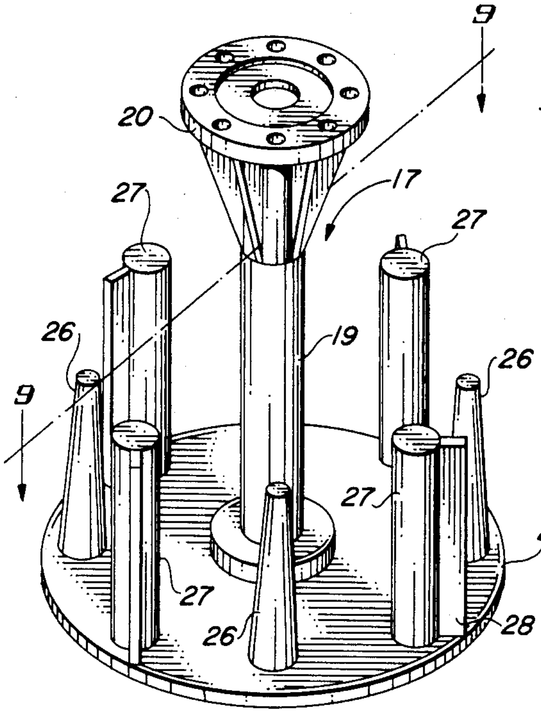

As used herein the expression "fatty acid source" means the raw materials which are customarily employed in soap manufacture such as the naturally occurring fats and oils which are triglycerides with three fatty groups randomly esterified with glycerol (tallow, lard, coconut oil, palm kernel oils and the like) or the fatty acids derived from the "splitting" or hydrolysis of the triglyceride fats and oils or the fatty acids derived from synthetic sources.

The expression "saponify" or "saponification" means either the neutralization of fatty acids to produce soap or the saponification of fats and/or oils to produce soap.

By intensive countercurrent mixing is meant causing a liquid stream of the reactants to rapidly move in a circular direction (e.g. counterclockwise) within a mixing vessel and at the same time bringing this rapidly moving stream into contact with mixing means rotating in a direction counter (e.g. clockwise) to the flow of the reactant stream. This head on meeting of the rapidly, circular moving stream with the counter rotating mixing means creates a generally rotary movement of the reactants within the vessel appearing much like an eddy stream or whirlpool. The reaction time can be shortened by mounting the counter-rotating means eccentrically within the vessel and at a short distance from the wall of the vessel. When the counter-rotating means are mounted it is also desirable to provide deflecting means within the vessel which serve to direct the stream of reactants to the counter-rotating means. The reactants are thereby directed into several counter moving paths and brought together again at high impact velocity.

By neat soap is meant the product resulting from the reaction of a fatty acid source with a suitable caustic or alkali and where neutralization is essentially completed, the product usually containing about 30% by weight of water.

The present invention improves on the intensive countercurrent mixing process for making soap by substantially reducing the time required in the cooling and moisture removal step in forming soap granules from neat soap, by applying a vacuum to a sealed countercurrent mixing vessel in which neat soap is being mixed.

Referring to the drawings, FIG. 1 shows an embodiment of the mixing equipment useful in this invention and is designated generally at 10. The mixer 10 can be described as a mixing pan 11 (see FIGS. 3-4) rotatably mounted within sealable vessel 12 which is in turn, mounted on frame 13. The frame 13 is inclined so that the mixing pan 11 is tilted from the horizontal, thereby using gravity to assist in working the reactants within the mixing pan. Access to the interior of the mixer and more specifically to the mixing pan 11 is provided by hinged loading door 14, which is designed to provide an air tight seal when closed. The equipment is further provided with a water and air tight discharge gate 15 (see FIG. 3) at the bottom of the mixing pan. The discharge gate allows for removal of the soap after saponification has been completed.

The mixing pan 11 is driven by motor 16 mounted adjacent to the vessel 12. The required horsepower of this motor is of course dependent on the size of the mixing pan employed and the characteristics of the batch of ingredients being processed. As previously mentioned, the mixing pan is rotatably mounted and in the particular embodiment illustrated in FIG. 3, rotates in a clockwise manner. Mounted to the top of mixer 10 and eccentrically within mixing pan 11 is rotor assembly 17. The rotor assembly 17 is provided with a separate variable speed motor 18 (see FIG. 2) so that the speed of the rotor assembly by be changed as desired. Referring to FIG. 5, the rotor assembly consists of shaft 19 and attachment member 20 for securing the assembly to the drive motor. Various type of mixing tools may be mounted on shaft 19, of which FIGS. 5-8 and FIG. 10 are examples.

The mixing tool of FIG. 5 consists of generally circular plate 21 beneath which are mounted pins 22. Weights 23 can be used to counterbalance the rotor assembly if this is required. FIG. 3 and FIG. 4 show a rotor assembly as disclosed in FIG. 5 and it is noted that the assembly is eccentrically mounted within the mixing pan and rotates in a direction counter to the direction of rotation of the mixing pan.

In FIG. 6 the mixing tool consists of two pairs of arms or knives 24 which are mounted at substantially right angles to each other and can be provided with balance weights 25 to counterbalance the assembly if such is necessary.

FIGS. 5 and 6 show different types of mixing tools which may be employed in the mixing equipment described herein and as shown in FIGS. 1-4. There is no significant difference in the mixing abilities of these tools although the mixing patterns are somewhat different. The star rotor shown in FIG. 6 splashed the mixture somewhat, which was not a problem when the pin mixing tool of FIG. 5 was used. Therefore the pin-style mixing tool is preferred.

Figure 9:
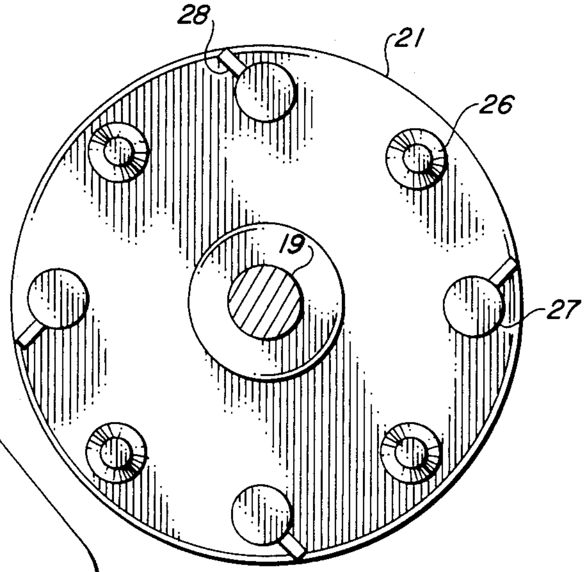
FIG. 9 is a sectional view of the rotor shown in FIG. 8 taken substantially on the line 9—9 of FIG. 8.

Referring to FIGS. 8 and 9, mounted at the end of shaft 19 is circular plate 21 to which are mounted a series of pins 26 and 27. Pins 26 are somewhat shorter than pins 27. Pins 27 are also provided with a generally rectangular shaped cutting blade 28.

It will be appreciated that a rotor assembly performs three functions in countercurrent mixing; that is, liquid mixing, dough chopping, and granulation of the product. A rotor assembly which is well adapted to perform these functions is shown in FIG. 7. The mixing tool of FIG. 7 consists of circular plate 21 beneath which are mounted pins 29. Above the plate 21 are mounted pins 30 and pins 31, pins 31 having horizontal chopper blades 32 secured to the top thereof. These chopper blades are mounted at the top of the pins 31, so as not to contact the fluid mixture until it is semi-solid and non-sticky.

Figure 10:
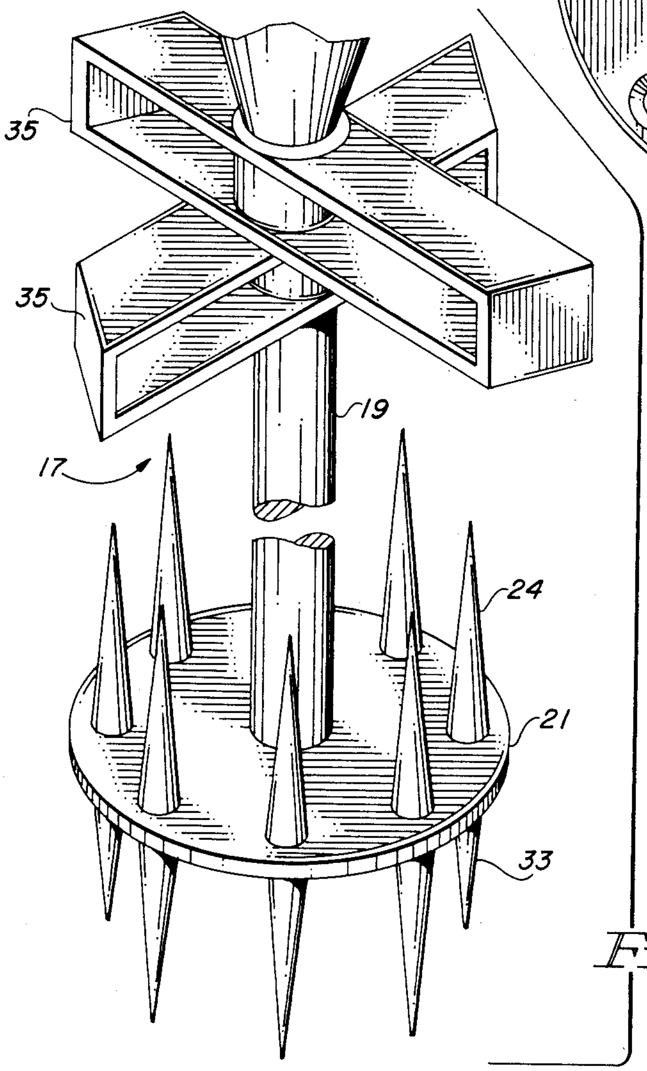

Another rotor assembly which is particularly well adapted to perform the liquid mixing, dough chopping, and granulation functions is shown in FIG. 10. Attached to the underside of plate 21 is a series of rather short pins 33 which are mounted about the perimeter of plate 21. These pins are designed to help promote mixing of the reactants while they are still in a liquid phase. Mounted to the top side of plate 21 is a series of longer pins 34 which are designed to help granulation of the product. Mounted near the top of shaft 19 are a pair of generally rectangular shaped open box-like choppers 35 designed not to contact the fluid reaction mass until it is semi-solid and non-sticky and therefore are mounted at a distance above the ends of pins 34.

Referring to FIGS. 1 and 2, it is seen that above the sealable vessel 12 is mounted a condenser 36. The mixing pan 11 (see FIGS. 3-4) is open to the condenser 36 via water vapor conduit 37. Although the interior of the condensor 36 is not shown, it is constructed in the conventional manner. Within the condenser 36 are a series of cooling tubes through which cooling water flows. The cooling water is introduced at the top of the condenser through coolant opening 38 and removed from the bottom of the condenser through a coolant drain (not shown). When the relatively warmer water vapor from the mixing pan comes into contact with the cooling tubes (which must be cooled to a temperature below the dew point of the warm water vapor), the warm water vapor condenses into liquid form on the tubes and the liquid water can then be drained out of the condenser 36 through water drain 39.

A vacuum may be applied to the mixing equipment of FIGS. 1-4 in the following described manner. A vacuum port 40 on the condenser 36 is open to the interior chamber of the condenser, which in turn, is open to the mixing pan 11 via water vapor conduit 37. Any of a number of well known devices for creating a vacuum may be connected to the vacuum port 40 to create a vacuum. The term "vacuum" as used herein, refers to a pressure within the sealable vessel 12 which is below ambient atmospheric pressure. In the embodiment shown in FIGS. 1 and 2 a vacuum pump of conventional design was used. The sizing of the vacuum pump will depend upon the size of the mixing equipment used and on the desired vacuum level.

Mounted within mixing pan 11 are means to insure that the materials within the mixing pan are subjected to the intensive countercurrent mixing operation. These means are secured to the top part of the mixing equipment immediately above the mixing pan and, as shown in FIG. 3 and FIG. 4 consist of a pan wall wiper 41 and pan bottom deflector 42 which is attached to the pan wall wiper. As the pan rotates in a clockwise direction, the pan wall wiper scrapes the reactant materials from the pan wall and directs such materials to the rotor area for improved mixing. In the same fashion, bottom deflector 42 gathers the reactant materials from the bottom of the mixing pan and directs them to the area of intensive mixing ensuring that all materials are subjected to the mixing process.

Figure 11:
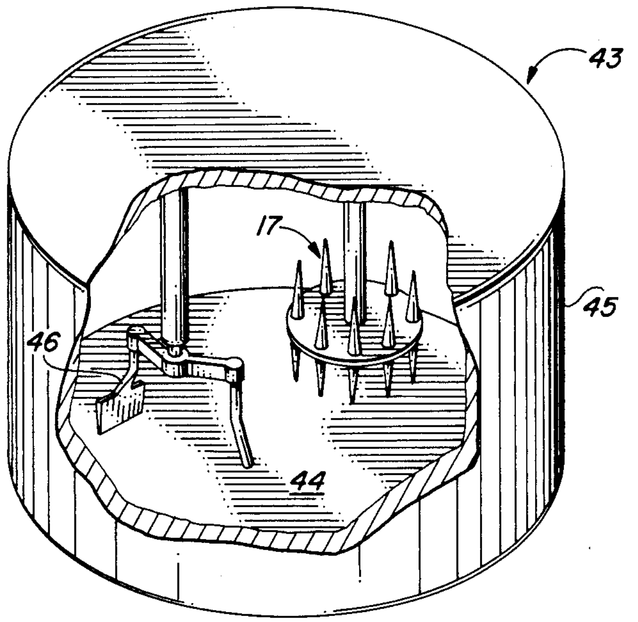
FIG. 11 is a perspective view of alternative mixing equipment adapted to provide the intensive countercurrent mixing of the fatty acid sources and caustic.
Figure 12:
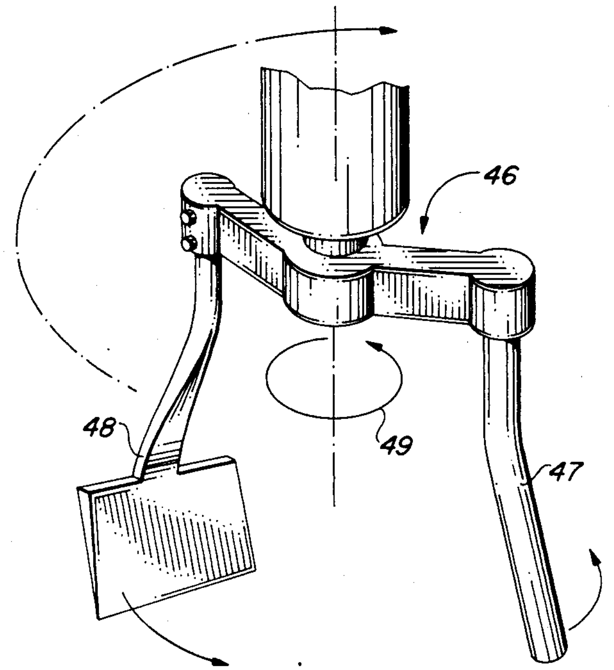
FIG. 12 is a perspective view of a mixing tool which is mounted within the mixing equipment shown in FIG. 11.
Figure 13:
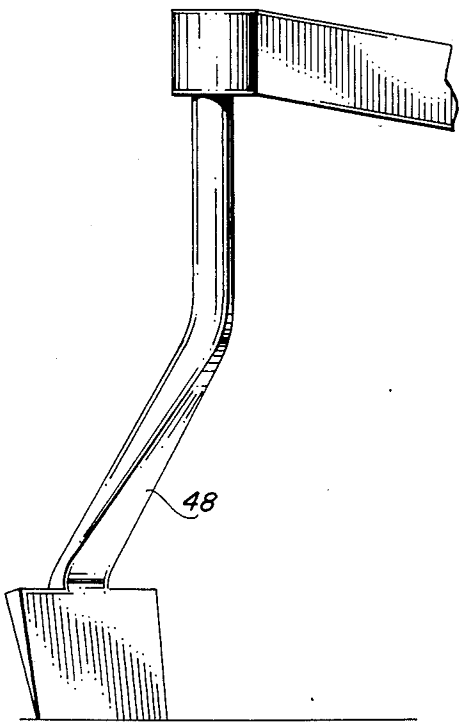
FIG. 13 is an enlarged view of the mixing plow on the mixing tool shown in FIGS. 11-12.

The mixing equipment depicted in FIG. 11 operates much on the same principles as that of FIG. 1 but is designed to operate in a horizontal orientation, whereas the mixing equipment of FIGS. 1-4 is tilted at a predetermined angle to the horizontal. The mixer shown generally as 43 has a rotatably mounted mixing pan 44 mounted within sealable vessel 45. Within the interior of the mixer is an eccentrically mounted rotating mixing tool 46 which is shown in greater detail in FIG. 12 and FIG. 13. Mixing tool 46 is provided with a kneading bar 47 and mixing plow 48, and is powered by a motor (not shown). As shown most clearly in FIG. 12, the mixing tool 46 rotates in a direction which is counter to the direction of rotation of the pan, which is shown by arrow 49. Thus as shown, the pan rotates in a clockwise direction and mixing tool 46 rotates in a counterclockwise direction. Also mounted within the mixer 43 is a high speed rotor assembly 17. This rotor is also designed to rapidly rotate in a direction counter to that of the pan. Various types of rotors may be used and FIGS. 5-8 and FIG. 10 are examples. The condenser and vacuum apparatus used in connection with this type of mixer are not shown.

OPERATION

Referring to the equipment shown in FIGS. 1-4 the required amount of fatty acid source can be introduced into the mixing equipment through the loading door 14 or preferably through valves (not shown) mounted in the sealable vessel 12. After the fatty acid source has been charged into the mixing pan 11 rotation of the pan is started and thereafter the caustic is charged into the mixing pan either through the loading door 14 or preferably through a valve in the sealable vessel 12. Rotation of rotor assembly 17 is begun and the intensive countercurrent mixing of caustic and fatty acid takes place. The head on meeting of the rapidly moving stream of caustic and fatty acid source with the counter rotating assembly 17 creates a generally rotary movement of the reactants within the mixing pan appearing much like an eddy stream or whirlpool is shown by dotted arrow 50 of FIG. 3. As processing proceeds, the reactants, which are initially in the liquid phase, gradually form a viscous, grainy appearing mass resembling mashed potatoes and it is at this stage that vacuum may be applied to enhance formation of soap granules. Continued mixing under vacuum cools and removes moisture from the soap mass, which results in a more viscous dough-like mass which, upon continued mixing, starts to pull apart and shred into taffy-like strands and eventually breaks down into non-tacky granules.

While the mixing is underway additives normally employed in soap making such as brine solution, chelating agents, glycerine, and the like can be introduced into the mixing pan via the loeding door 14 or through an appropriate valve in the sealable vessel 12.

In practicing the process of the present invention, the fatty acid sources employed may be of any of those which are customarily used in the making of soap. The limitation on the types of fatty acid sources employed is therefore dependent only on the particular qualities of the soap which are desired: Where fatty acids are readily available, such acids ranging in chain length from 6 to 18 are usually employed.

The fatty acids and/or triglycerides are preferably liquid and at a temperature ranging from the melting point of the fatty acids or triglycerides to about 170° F. Although the reaction takes place somewhat more rapidly when these materials are at higher temperatures, because fatty acid sources at the lower temperatures give satisfactory results and are more easily handled, the optimum temperature range is from the melting point of such sources to about 140° F.

Aqueous sodium hydroxide is commonly used to saponify the fatty acids or triglycerides, although aqueous potassium hydroxide can be uses in the preparation of a so-called softer soap since the potassium soaps are more water soluble than the sodium soaps. It is also possible to use blends of the two alkalis in order to achieve special properties.

The amount of caustic employed in this process is that which is theoretically necessary to completely saponify the fatty acid source, excepting in the production of so-called superfatted soap where the fatty acid source would be in excess. The caustic should be in liquid form and depending in the desired moisture content of the soap granules, will be at a concentration ranging from 10% to 70% with the optimum being about 50%. It is possible to use 100% caustic when using ingredients which are high in moisture such as an alpha olefin sulfonate solution which normally contains about 70% by weight of moisture. The temperature of the caustic solution will normally range from about 120° F. to about 210° F. The amount of water present in the caustic and other additives customarily used in soap products will affect the amount of time required to reach the desired moisture level in the final soap granules. In addition, the saponification reaction itself produces some water as shown by the following:

Fatty Acid + Caustic Soda = Soap + Water $$R\text{—}COOH + NaOH = R\text{—}COONa + H_2O$$

Thus according to the foregoing, in theory approximately 6% by weight of water will be obtained in the reaction. This of course does not take into account water which is lost through the heat generated by the reaction, which we have found to usually be about 3% by weight of soap produced.

In reacting the fatty acid sources and caustic through the use of intensive countercurrent mixing, it is also possible and even desirable to incorporate into the mixture other ingredients that are customarily found in soap products, such as perfumes, colorants, emollients and the like. It is preferable that these additional materials be added to the mixing vessel after the saponification reaction has proceeded for a period of time.

In subjecting the fatty acid source and caustic to intensive countercurrent mixing, we find that the application of vacuum to the sealed mixing vessel during saponification greatly enhances the formation of soap granules. The application of vacuum not only minimizes processing time and energy requirements but, in addition, serves to reduce the moisture level and lower the temperatures of the reaction mixture which also helps to preserve heat sensitive ingredients. Although most fatty acids and triglycerides and caustic are basically not heat sensitive, other additives which may be included in the mixture, such as perfumes and oxidation inhibitors are, and the cooling of the soap mass in this manner serves to protect such ingredients. It is preferable to apply the vacuum when the saponification reaction is essentially complete, or at the neat soap stage. For a mixing pan having a capacity of about 900 pounds it has been found that applying a vacuum of from about 150 millibars to about 45 millibars works satisfactorily. The vacuum is applied in the following manner. Referring again to FIGS. 1 and 2, when it is desired to apply a vacuum (normally after saponification is essentially completed) the sealable vessel 12 is closed so as to be air tight. The vacuum pump is then started, which begins drawing air and moisture from the mixing pan 11, through the water vapor conduit 37 into the condenser 36 where the water vapor is exposed to the cooling tubes within the condenser 36. As the water vapor contacts the cooling tubes in the condenser, the water vapor condenses on the cooling tubes. As shown in FIG. 1, the condenser 36 is inclined from the horizontal, so that the condensed water will flow to the lower end of the condenser where it is drained from the condenser into the water drain 39 and into a closed water receiver (not shown). Since the vacuum port 40 is at the upper end of the condenser 36, the air being drawn out through the vacuum port to the vacuum pump will have essentially no moisture, assuming that an appropriately sized condenser is used.

The order of addition of the principal reactants in this process does seen to affect the quality of the end product and can vary depending upon the batch size. Although acceptable soap granules are formed with virtually any order of addition, the preferred procedure with a mixing vessel as shown in FIGS. 1-4 is to charge the fatty acid source into the mixing vessel followed by a start up of the rotating pan. The rotor is then started, and the caustic is fed into the vessel over about a 2 minute period. After the intensive countercurrent mixing has proceeded for a period of time, the free caustic level of the soap can be adjusted by adding either additional caustic or fatty acids. When it has been determined that neutralization is essentially completed, vacuum is applied to cool the mixture and to help remove moisture. The moisture level can be determined by appropriate measuring instruments. Normally the cooling and moisture removal process continues until soap granules are formed having a water content of about 10–20%, in order to make soap bars or flakes. The process can be continued until the soap becomes a powder and has a moisture content of from about 3–8%.

When using a mixing vessel such as is shown in FIGS. 1-4 which has a capacity of about 900 pounds, the most preferred procedure is to initially introduce at least a portion of the fatty acid source and then begin to introduce the caustic. Thus a preferred order of addition in such a vessel is as follows:

a. Charge the fatty acid source.

b. Start rotation of pan and high speed rotor.

c. Gradually feed the caustic into the mixing pan.

d. Add brine and other additives as may be desired at this stage.

e. Continue mixing until saponification is essentially complete.

f. Gradually begin applying vacuum, either continually increasing the vacuum or increasing the vacuum in a stepwise manner, while continuing the intensive countercurrent mixing.

g. Stop applying vacuum and if desired, add a slurry of additives.

h. Remove granules when desired moisture level is obtained.

When processing neat soap, the neat soap is introduced into the vessel and rotation of the pan is begun. Thereafter the rotor assembly is started and brine solution and other additives such as chelating agents, glycerine, silicate and the like may be added. It is also possible to blend these additives into the neat soap prior to its introduction into the mixer. Vacuum is started while continuing the intensive countercurrent mixing. When the desired moisture level is achieved, a soap slurry and perfume can be added, and the resulting soap in granular or powder form is discharged when the slurry and perfume are completely mixed into the soap mass. The pan speeds and rotor speeds employed are substantially the same as when starting with an unreacted fatty acid source and caustic. It should be noted that neutral soap granules containing none of the above additives can be produced by the disclosed mixing technique. Such additives may be included in the granules at a later stage.

In Examples I and II all the processing was conducted in a Model R15 Eirich Mixer manufactured by Maschinenfabrik Gustav Eirich of Nordbaden, West Germany. The mixer used in Example I was additionally equipped with a sealable vessl surrounding the mixing pan, and with vacuum apparatus and a condenser as shown in FIGS. 1-4. This mixer has a batch a batch size of about 900 pounds.

EXAMPLE I

A tallow/coco fatty acid soap was prepared from the following materials:

| | |
|---|---|
| Tallow/coco fatty acid (85:15) | 539.5 lbs. |
| Caustic (50% solution of NaOH) | 164.0 lbs. |
| Brine (7.9% solids) | 30.4 lbs. |
| Slurry (colorant & water) | 17.2 lbs. |
| Total Weight | 751.0 lbs. |

In preparing the soap by intensive countercurrent mixing, the following steps were followed:

1. The fatty acid was charged into the mixing pan over a period of about 2 minutes and pan rotation begun at 18 rpm, the mixing apparatus being left open to the atmosphere.

2. The rotor was started at 600 rpm, and the caustic solution was fed into the mixing pan over a period of about 2.5 minutes.

3. Rotor speed was increased to 1200 rpm, and the brine was fed into the mixing pan over a period of about 1 minute, and intensive countercurrent mixing continued for about 14 minutes until saponification was essentially complete (until neat soap was formed).

4. The neat soap was then cooled (from a temperature of about 176° F. to a temperature of about 90° F.) and moisture removed as follows: The rotor speed was reduced to 600 rpm and the vessel sealed to the atmosphere, and a vacuum of 145 millibars applied to the soap in the vessel for about 3 minutes. The vacuum was then increased to 69 millibars for a further 3 minute period, and finally, the vacuum was increased to 51 millibars for about 2 minutes until soap granules of the desired consistency were formed.

5. The vessel was then opened to the atmosphere and the slurry added over a period of about 1.5 minutes, and countercurrent mixing was continued for another 2 minutes at a rotor speed of 600 rpm, to complete the amalgamation step.

The resulting soap granules were analyzed and found to have a moisture content of about 11.5%. The total time to produce the batch of granules was 31 minutes, and the total amount of soap produced was 686 pounds (from a total ingredient weight of 751 pounds). The water removed by the vacuum pump and drained from the condenser was collected and amounted to about 70.5 pounds.

In the foregoing Example the fatty acids were charged into the mixing pan at a temperature of 110° F. Preferably however, the fatty acids would be charged at a temperature of about 140° F., which would be expected to accelerate the saponification reaction. Moreover, although the mixing pan in this Example was left open to the atmosphere during saponification, it would be expected that the saponification reaction would be accelerated were the vessel sealed to the atmosphere during this step, because the heat generated by the exothermic reaction would not be lost to the same extent, and the pressure inside the vessel would correspondingly increase making the vessel a pressure cooker. In addition, sealing the vessel during saponification would essentially eliminate water loss to the atmosphere during saponification, thus helping maintain the stoichiometric amount of water needed to optimize the reaction.

It should be noted that the order of charging the fatty acids and caustic into the mixing pan could be changed without substantially affecting the reaction, and the order of charging to obtain optimal results in different types of intensive countercurrent mixers will vary. In fact, saponification would proceed under intensive countercurrent mixing even if the fatty acids and caustic were charged together at the same time, although the procedure of charging one component first (e.g., fatty acids) and then gradually introducing the other component (e.g., caustic) does beneficially affect the homogeneity of the mixture and hence benefits the saponification reaction.

Referring to the cooling and moisture removal step described in step 4 in Example I above, it has been found that if the vessel is suddenly sealed from the atmopshere and a strong vacuum applied to the neat soap in the vessel, the soap will aerate and some soap will be drawn up into the condenser and its related piping, plugging the same and significantly reducing the moisture removal and cooling rates.

EXAMPLE II

To measure the effect of using a vacuum during the cooling and moisture removal step in producing soap granules, a comparison of the run in Example I was made with another run using the same type and capacity of intensive countercurrent mixer, but without the benefit of vacuum. Rather than using a vacuum applied to a closed vessel to cool and remove moisture from the neat soap following saponification, the comparison run used an air blower to blow air into a pan which is open to the atmosphere as disclosed in U.S. Pat. Nos. 4,397,760 and 4,474,683. This results of this comparison are as follows:

| | Vacuum Process | Air Blow |
|---|---|---|
| Batch Size | | |
| Total Input | 751.0 lbs. | 916.0 lbs. |
| End Product | 686.0 lbs. | 837.0 lbs. |
| Time Sequence | | |
| Charge Fatty Acids | 2.0 mins. | 2.0 mins. |
| Feed Caustic, Brine & Saponify | 17.5 mins. | 25.0 mins. |
| Cooling and Moisture Removal | 8.0 mins. | 21.0 mins. |
| Amalgamation of Slurry | 3.5 mins. | 5.5 mins. |
| Totals | 31.0 mins. | 53.5 mins. |

Since the major difference in the two processes is in the cooling and moisture removal step (the Vacuum process of Example I applying a vacuum to a vessel sealed to the atmosphere; and the Air Blow process using an air blower to blow air into a pan which is open to the atmosphere), it would be instructive to compare the time required per pound of end product to produce the desired soap granules through cooling and moisture removal. The Vacuum process requires 0.012 minutes per pound (8.0 minutes divided by 686 pounds of end product) to produce granules from neat soap, and the Air Blow process requires 0.025 minutes per pound (21.0 minutes divided by 837 pounds of end product) to produce granules. Thus, the Vacuum process in this comparison yielded a highly significant 52% reduction in the time required per pound of end product to cool and remove moisture from neat soap to produce granules, as compared to the Air Blow process.

Of course, as previously explained, a time reduction in the cooling and moisture removal step is not the only time reduction obtainable from the vacuum process. Sealing the vessel during the saponification step will accelerate the saponification reaction, yielding a time reduction in the saponification step as well as in the cooling and moisture removal step.

From the foregoing it is apparent that intensive countercurrent mixing and applying vacuum to cool and remove moisture from the soap mass as described herein provides a superior technique for rapidly producing a low moisture soap in granular form, and it will be appreciated by those skilled in the art that equivalent alternatives to the preferred embodiments can be perceived, all of which are embraced by the claims herein.

What is claimed is:

1. A process for making water soluble soap granules from raw materials normally employed in soap manufacture including a fatty acid source, caustic and water, the amount of water present being such that the concentration of caustic is from 10% to 70% by weight of the water, comprising the steps of introducing said materials into an enclosed mixing vessel, causing said materials in said vessel to rotate in a generally circular path while simultaneously bringing said materials into contact with a rotating means mounted within said vessel, said means rapidly rotating in a direction counter to the initial direction of flow of said materials in said vessel whereby saponification takes place, making the vessel substantially air tight and applying a vacuum to said materials within said vessel whereby soap granules are formed having a moisture content of less than about 20% by weight.

2. The process according to claim 1 wherein said materials also include a synthetic detergent.

3. The process according to claim 1 wherein said fatty acid source are long chain monocarboxylic acids having a chain length of from 6 to 18 carbon atoms.

4. The process according to claim 1 wherein said counter rotating means are mounted eccentrically within said vessel and at a distance from the wall of said vessel.

5. The process according to claim 1 whereby the contact of said materials with the rapidly rotating means creates a series of whirlpools of said materials within said vessel.

6. The process according to claim 1 wherein said soap granules are removed from said vessel and thereafter subjected to plodding, extrusion and stamping to form soap bars.

7. The process according to claim 1 wherein said materials in said vessel are initially in a liquid phase and with continued mixing become a viscous dough-like mass, thereafter into strands and finally into granules.

8. A process for making water soluble soap in the form of granules from materials normally employed in soap manufacture including a fatty acid source, caustic and water, the amount of water present being such that the concentration of caustic is from 10% to 70% by weight of the water, comprising the steps of introducing said materials into an enclosed mixing vessel, causing said materials to be subjected to intensive countercurrent mixing for a period of time sufficient to saponify said materials, making the vessel substantially air tight and applying a vacuum to said materials within said vessel to form soap granules having a moisture content of less than about 20% by weight.

9. The process according to claim 1 wherein said fatty acid source and caustic are in liquid form.

10. The process of claim 2 wherein said synthetic detergent is an alpha olefin sulfonate.

11. A process for making water soluble soap in granular form from raw materials normally employed in soap manufacture including a fatty acid source, caustic and water, the amount of water present being such that the concentration of caustic is from 10% to 70% by weight of the water, comprising the steps of introducing said fatty acid source into an enclosed mixing vessel provided with a pan and a rotating means mounted within said pan and said vessel, each of said pan and said means being rotatable in a direction counter to each other, starting the rotation of said pan and said rotating means, introducing said caustic and water into said pan, making said vessel substantially air tight, beginning the application of vacuum to the materials within said vessel after saponification is essentially complete and continuing the rotation of said pan and rotating means until soap granules having a moisture content of less than about 20% by weight are obtained.

12. The process of claim 1 wherein the resulting product is in powder form and has a moisture content of less than about 10% by weight.

13. The process of claim 1 wherein the amount of vacuum is increased as the processing of said materials takes place.

14. A process for making water soluble soap granules from a mixture of a fatty acid source, caustic or alkali and water, the amount of water present being such that the concentration of caustic is from 10% to 70% by weight of the water, wherein neutralization of said fatty acid source has proceeded to some degree comprising the steps of introducing said mixture into an enclosed mixing vessel, causing said mixture in said vessel to rotate in a generally circular path while simultaneously bringing said mixture into contact with a rotating means mounted within said vessel, said means rapidly rotating in a direction counter to the initial direction of flow of said mixture in said vessel whereby saponification, if required, takes place, making said vessel substantially air tight and applying a vacuum to said mixture within said vessel whereby soap granules are formed having a moisture content of less than about 20% by weight.

15. A process according to claim 14 wherein said mixture also includes a synthetic detergent.

16. The process according to claim 14 wherein said fatty acid source are long chain monocarboxylic acids having a chain length of from 6 to 18 carbon atoms.

17. A process according to claim 14 wherein neutralization of said fatty acid source is essentially completed prior to introduction into said mixing vessel.

18. A process according to claim 17 wherein said counter rotating means are mounted eccentrically within said vessel and at a distance from the wall of said vessel.

19. A process according to claim 17 wherein said soap granules are removed from said vessel and thereafter subjected to plodding, extrusion and stamping to form soap bars.

20. The process of claim 14 wherein the amount of vacuum is increased as the processing of said materials takes place.

21. The process of claim 1 wherein the concentration of caustic is about 50% by weight of the water.

22. The process of claim 8 wherein the concentration of caustic is about 50% by weight of the water.

23. The process of claim 11 wherein the concentration of caustic is about 50% by weight of the water.

24. The process of claim 14 wherein the concentration of caustic is about 50% by weight of the water.

* * * * *